United States Patent
Oroskar et al.

(10) Patent No.: US 10,433,255 B1
(45) Date of Patent: Oct. 1, 2019

(54) CONTROL OF REPORTING A DEVICE'S REMAINING BATTERY ENERGY LEVEL

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 109 days.

(21) Appl. No.: 15/583,444

(22) Filed: May 1, 2017

(51) Int. Cl.
| | |
|---|---|
| H04W 52/02 | (2009.01) |
| H04W 24/02 | (2009.01) |
| H04W 76/27 | (2018.01) |
| H04W 76/28 | (2018.01) |
| H04W 8/24 | (2009.01) |

(52) U.S. Cl.
CPC ......... *H04W 52/0261* (2013.01); *H04W 8/24* (2013.01); *H04W 24/02* (2013.01); *H04W 52/0212* (2013.01); *H04W 52/0277* (2013.01); *H04W 76/27* (2018.02); *H04W 76/28* (2018.02)

(58) Field of Classification Search
CPC ......... H04W 52/0261; H04W 52/0212; H04W 52/0277; H04W 24/02; H04W 76/27; H04W 76/28; H04W 8/24
See application file for complete search history.

(56) References Cited

U.S. PATENT DOCUMENTS

| | | | | |
|---|---|---|---|---|
| 2010/0144299 A1* | 6/2010 | Ren | ...................... | H04B 1/1615 455/226.1 |
| 2011/0134827 A1* | 6/2011 | Hooli | .................... | H04W 72/04 370/315 |
| 2012/0282916 A1* | 11/2012 | Futaki | .................. | H04W 24/10 455/422.1 |
| 2013/0267213 A1* | 10/2013 | Hsu | .................. | H04W 52/0232 455/418 |
| 2014/0247742 A1* | 9/2014 | Lee | .................. | H04W 52/0216 370/252 |
| 2015/0045033 A1* | 2/2015 | Kim | .................. | H04B 7/15507 455/436 |
| 2016/0205628 A1* | 7/2016 | Konno | .................... | H04W 8/22 370/311 |
| 2017/0251421 A1* | 8/2017 | Albasheir | ............... | H04L 47/18 |
| 2017/0325281 A1* | 11/2017 | Hong | ................. | H04W 72/048 |

* cited by examiner

*Primary Examiner* — Kwang B Yao
*Assistant Examiner* — Moo Jeong

(57) ABSTRACT

Disclosed is a method and system that may help control when a network will request (and receive) a remaining battery energy level report from a UE. Per the disclosure, a network that has an established radio-link-layer connection with the UE could track an amount of time in which the UE operates in a radio-link-layer connected mode. The network could then determine whether the amount of time in which the UE has operated in the radio-link-layer connected mode has exceeded a predetermined threshold amount of time. And responsive to determining that the amount of time in which the UE has operated in the radio-link-layer connected mode has exceeded the threshold amount of time, the network could cause the UE to report to the network the remaining battery energy level of the UE.

20 Claims, 4 Drawing Sheets

CONTROL OF REPORTING A DEVICE'S REMAINING BATTERY ENERGY LEVEL

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices, could operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Long Term Evolution (LTE) (using Orthogonal Frequency Division Multiple Access (OFDMA) and Single Carrier Frequency Division Multiple Access (SC-FDMA)), Code Division Multiple Access (CDMA) (e.g., 1xRTT and 1xEV-DO), Global System for Mobile Communications (GSM), IEEE 802.11 (WIFI), and BLUETOOTH, among others. Each protocol may define its own procedures for registration of UEs, initiation of communications, handover between coverage areas, and other functions related to air interface communication.

When a UE enters into coverage of a base station, the UE and base station could engage in signaling with each other to establish a radio-link layer connection through which the base station and UE could exchange bearer data. In that state, the UE is considered to be in a "connected" (or "active") mode, in which the UE could transmit bearer data to the base station and the base station could transmit bearer data to the UE. Further, once there has been a threshold period of no communication flowing over the UE's radio-link layer connection, the base station may release the UE's radio-link layer connection, transitioning the UE to an "idle" (or "dormant") mode. In the idle mode, the UE may periodically check for page messages from the base station and, if the UE detects a page message or otherwise seeks to engage in bearer communication, the UE could then engage in signaling with the base station to transition back to the connected mode. And this process may then repeat, with the UE operating in the connected mode and then transitioning to the idle mode and so forth.

OVERVIEW

When a base station is serving a UE, it could be useful for the base station to learn the UE's remaining battery energy level. Knowledge of the UE's remaining battery energy level could enable the base station to take various actions to help conserve the UE's battery energy when the battery energy level is relatively low. For instance, the base station could direct the UE to operate for a longer period of time in a low power mode.

To facilitate learning the UE's remaining battery energy level, the base station could transmit to the UE a request for the UE to report its remaining battery energy level, and the UE could respond to the base station with a report of the UE's remaining battery energy level. In practice, for instance, the base station could trigger this process each time the UE transitions to the connected mode (e.g., when the UE first enters into the connected mode, and each time the UE transitions from the idle mode to the connected mode).

Unfortunately, however, this process of the base station transmitting a request for battery energy level and the UE transmitting a report of its battery energy level may consume limited resources. For instance, the process may consume air interface resources on both the downlink and the uplink. Further, the process may consume processing resources at both the base station and the UE, and may in fact also have the detrimental effect of consuming more of the UE's battery energy. Therefore, an improvement is desired.

Disclosed is a method and system to help control when the base station will request (and receive) a remaining battery energy level report from a UE. In accordance with the disclosure, UE operation in the connected mode may consume more battery energy than UE operation in the idle mode, and therefore, UE operation in the connected mode may correlate with higher battery energy usage. Given this, the base station could use a detected threshold extent of UE operation in the connected mode as a trigger for requesting the UE to report the UE's remaining battery energy level. In particular, the base station could monitor how long the UE has operated in the connected mode (whether continuously or in total over separate instances), and when that duration becomes threshold long, the base station could request the UE to report the UE's remaining battery energy level.

Accordingly, in one respect, disclosed is a method operable by a base station that has an established radio-link-layer connection with a UE. The method involves the base station tracking an amount of time in which the UE operates in a radio-link-layer connected mode. The method also involves the base station determining that the amount of time in which the UE has operated in the radio-link-layer connected mode has exceeded a predetermined threshold amount of time. The method further involves, responsive to determining that the amount of time in which the UE has operated in the radio-link-layer connected mode has exceeded the threshold amount of time, the base station causing the UE to report to the base station the remaining battery energy level of the UE.

In another respect, disclosed is a method operable by a controller in a system that includes a base station that has an established radio-link-layer connection with a UE. The method involves the controller tracking an amount of time in which the UE operates in a radio-link-layer connected mode. The method also involves the controller determining that the amount of time in which the UE has operated in the radio-link-layer connected mode has exceeded a predetermined threshold amount of time. Further, the method involves, responsive to determining that the amount of time in which the UE has operated in the radio-link-layer connected mode has exceeded the threshold amount of time, the controller causing the UE to report to the base station the remaining battery energy level of the UE.

Still further, disclosed is a wireless communication system operable to carry out various features described herein. Per the disclosure, the wireless communication system includes a base station that serves a user equipment device (UE) over an air interface connection between the UE and the base station. While being served by the base station, the UE has two mutually exclusive modes of operation: (a) a connected mode in which there the UE has an established radio-link-layer connection with the base station, and (b) an idle mode in which the UE lacks the established radio-link-layer connection with the base station.

Additionally, the wireless communication system includes a controller comprising at least one processing unit, data storage, and program instructions stored in the data storage and executable by the at least one processing unit to carry out operations. The operations that could be carried out include operating a timer for tracking an amount of time that the UE operates in the connected mode. Further, the operations include, based on the timer, determining that the amount of time that the UE has operated in the connected mode is greater than a threshold amount of time. And the operations include responsive to the determination and based at least in part on that the UE is operating in the connected mode, causing the UE to report to the base station a remaining battery energy level of the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
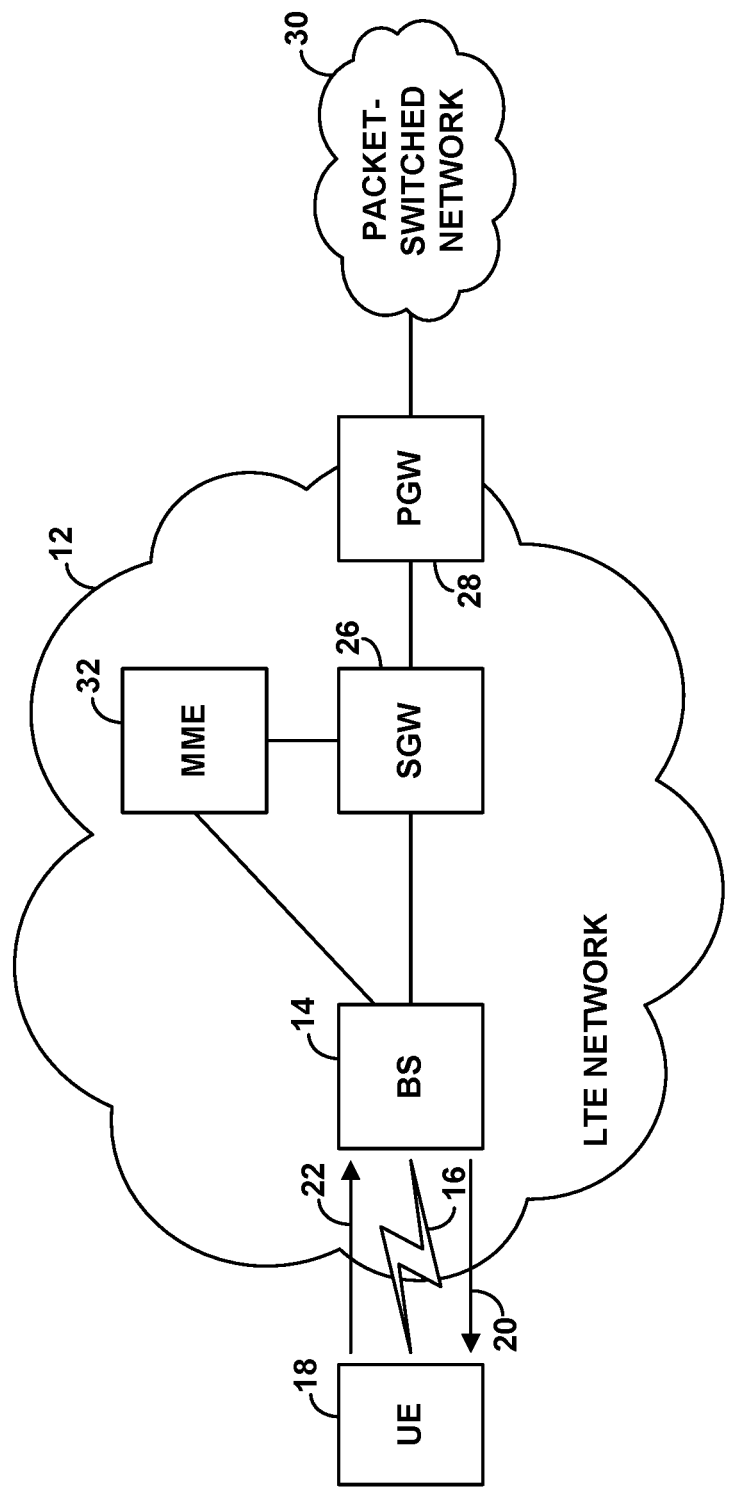
FIG. 1 is a simplified block diagram of an example system in which features of the present disclosure can be implemented.

The present method and system will be described herein in the context of an LTE network. It should be understood, however, that the disclosed principles can extend to apply in various other contexts as well, such in connection with other types of networks. Further, numerous variations from the specifics described may be possible. For instance, elements and steps could be added, removed, combined, distributed, reordered, replicated, or otherwise modified. Further, it will be understood that various operations described herein as being carried out by one or more entities could be so carried out by or on behalf of the one or more entities, and by hardware, firmware, and/or software (such as by one or more processing units programmed with instructions executable to carry out the operations).

Referring to the drawings, as noted above, FIG. 1 is a simplified block diagram of an example system in which aspects of the present disclosure can be implemented. As shown in the figure, the example system includes at its core a representative LTE network 12 that includes a representative LTE base station (evolved Node B (eNodeB)) 14 radiating to provide a coverage area 16 in which UEs, such as a representative UE 18, could be served by the base station over an air interface defining a downlink 20 and an uplink 22.

As further shown in FIG. 1, base station 14 has a communication interface with a serving gateway (SGW) 26 having an interface with a packet data network gateway (PGW) 28, which in turn provides connectivity with a packet-switched network 30 such as the Internet or a private network. In addition, the base station is also shown having a communication interface with a mobility management entity (MME) 32, which also has a communication interface with the SGW 26. In practice, these various entities may sit as nodes on a wireless service provider's core packet network, and the interfaces between the entities may be logical connections over that packet network.

In accordance with a recent version of LTE, the air interface provided by base station 14 operates on a carrier frequency defining an extent of frequency bandwidth, including possibly separate frequency channels for the downlink and uplink (in a frequency division duplex (FDD) arrangement) or a common frequency channel shared over time between downlink and uplink (in a time division duplex (TDD) arrangement). Further, the air interface is divided over time into a continuum of 10-millisecond frames each divided into ten 1-millisecond subframes or transmission time intervals (TTIs), and then further divided into 0.5 millisecond slots. And in every subframe, the frequency bandwidth is divided into physical resource blocks (PRBs) or other air interface resources.

On the downlink and the uplink, the LTE air interface further defines some particular channels with special purposes. For instance, on the downlink, the air interface defines a physical downlink control channel (PDCCH) for carrying scheduling directives and the like from the base station to UEs, and a physical downlink shared channel (PDSCH) for carrying scheduled downlink data transmissions to UEs. And on the uplink, the air interface defines a physical random access channel (PRACH) for carrying random access requests from UEs, and a physical uplink shared channel (PUSCH) for carrying scheduled uplink data transmissions from served UES.

In a system arranged as described above, when the UE enters into coverage of the base station, the UE may detect the base station's coverage on a particular carrier, and the UE and base station may engage in an attach process or handover process to register with the LTE network on that carrier, configuring service of the UE by the base station on that carrier. For instance, the UE may initially transmit an access request message on the carrier to the base station, and the UE and base station may then engage in signaling in accordance with a Radio Resource Control (RCC) protocol to establish a radio-link-layer connection (RRC connection) on which the UE and base station could engage in further communication. In turn, the UE may then transmit to the base station via the RRC connection an attach request seeking to register with the LTE network and be served by the base station, and the base station may pass the attach request along to the MME for processing.

After authenticating the UE, the MME may then engage in signaling with the base station and SGW to establish for the UE one or more logical bearer connections, or bearers, between the UE and the PGW. Each such bearer may include a radio bearer portion over the air interface between the UE and the base station, and a service bearer or access bearer portion between the base station and the PGW via the SGW. Further, the bearer may have a designated quality-of-service (QoS) level or traffic class defining a QoS of communications over the bearer, such as whether the bearer is to provide a certain guaranteed bit rate (GBR) level of throughput. In one implementation, this QoS level or traffic class may be represented as a QoS class indicator (QCI), which defines various QoS parameters (e.g., priority, delay, loss rate, etc.) for how the network is to handle the communications on the bearer.

With service of the UE so configured, the base station could then serve the UE with data communications over the air interface. As noted above, the UE may operate in a connected mode in which the UE has a radio-link-layer connection with the base station and thus may engage in bearer data communications, such as voice calls and/or data sessions, on a carrier's air interface resources assigned by the base station.

As additionally noted above, after a timeout period of no bearer data communication between the UE and the base station, or for other reasons, the network may automatically release the UE's established radio-link-layer connection and perhaps one or more bearers for the UE between the base station and the gateway system, while maintaining at least some network records and/or connections for the UE. At that point, the UE may then be considered to be in an idle mode in which the UE does not have a radio-link-layer connection with the base station and thus does not engage in bearer data communications. In the idle mode, if the system has bearer data to transmit to the UE or if the UE has data to transmit to the system, the UE may need to engage in an access and connection process similar to or the same as that described above, to acquire a radio-link-layer connection over which the data could flow, transitioning the UE back to connected mode.

Furthermore, in the process of transitioning from connected mode to idle mode and/or while in idle mode, the UE could operate in a discontinuous reception (DRX) mode in order to conserve battery power and/or for other reasons. More specifically, when the UE is operating in the connected mode, once the UE's bearer data communication finishes, the UE could initiate a DRX inactivity timer. If there is no further bearer data communication before expiration of the DRX inactivity timer, the UE may then enter DRX mode responsive to expiration of the DRX inactivity timer. Moreover, when the UE enters idle mode after the timeout period (typically longer than the DRX inactivity timer), the UE could additionally or alternatively operate in the DRX mode during the idle mode.

When the UE operates in the DRX mode, the UE could operate with a DRX cycle in which the UE cycles between operating in a low power mode and "waking up" to check for messages (e.g., page messages or downlink control signaling) and/or to transmit uplink control signaling. More specifically, when the UE operates in the low power mode the UE does not engage in any communication with the network. And when the UE "wakes up" from time-to-time for a particular duration the UE could check for messages from the network and/or transmit uplink control signaling to initiate communications with the network. Thus, if the network has a call or other bearer communication to provide to the UE, the network could transmit a message destined to the UE, and the UE could detect that message when it is "awake" and could responsively engage in signaling with the network (e.g. to re-establish a radio-link-layer connection) so as to then receive the communication. And if the UE has a call or other bearer communication to initiate, the UE could similarly engage in signaling with the network when "awake" (e.g., to re-establish a radio-link-layer connection) so that the UE could then provide that communication. Otherwise, if the UE does not detect a message and does not have uplink control signaling to transmit while "awake," the UE could return to the low power mode before "waking up" again according to the DRX cycle, and so on.

Further, when the network serves the UE, the network could maintain a record of the UE's operation in the various modes described above. For example, as the UE transitions between the connected mode and the idle mode, the network could receive signaling indicative of that transition and could update a context record of the UE to indicate whether the UE is operating in the connected mode or in the idle mode. In another example, based on timing measured from the last bearer data communication with the UE and on information about the duration of the DRX inactivity timer, the network could determine a length of the DRX cycle. With these arrangements, the network could then effectively maintain a device history record for the UE that includes information about the UE's operation in the connected, idle, and/or DRX modes and thus may include information indicative of how frequently the UE communicates bearer data, among other information. Other examples are also possible.

In line with the discussion above, when the network serves the UE, it may be useful for the network to know a battery energy level of the UE so that the network could take remedial actions that could help conserve the UE's battery energy when the battery energy level is relatively low. One remedial action could involve the network directing the UE to increase the length of the DRX cycle of the UE so that the UE then operates for a longer period of time in the lower power mode. Another remedial action could involve the network releasing the UE's established radio-link-layer connection, transitioning the UE to operate in the idle mode. Other remedial actions are possible.

To facilitate learning the UE's remaining battery energy level the network could transmit to the UE a request for the UE to report its remaining battery energy level. In practice, as noted above, the network could transmit the request each time the UE establishes a radio-link-layer connection with a base station of the network, perhaps when the UE transitions to the connected mode or when the UE is handed over from one base station to another. More particularly, upon establishing the radio-link-layer connection, the network could transmit on the downlink to the UE an RRC Connection Reconfiguration message that requests the UE's remaining battery energy level. And in response, the UE could transmit on the uplink to the network a report of the UE's remaining battery energy level.

However, as explained above, this process of the network transmitting a request for the UE's battery energy and the UE transmitting a response to the network could consume limited resources, such as air interface resources and/or processing power of the UE and/or entities of the network. And because the UE may frequently establish a radio-link-layer connection with the network, the network carrying out the process each time a radio-link-layer connection is established could result in frequent consumption of the limited resources, thereby causing problems such as congestion of the air interface.

In accordance with the disclosure, as noted above, the network could determine based on how long the UE operates in the connected mode when to request from the UE to report a remaining battery energy level of the UE. In particular, how long the UE operates in the connected mode as opposed to the idle mode could determine when to request from the UE to report the remaining battery energy level of the UE. For instance, the network could track how long the UE operates in the connected mode, and when the UE operates in the connected mode for a threshold amount of time, the network could then request from the UE to report the UE's remaining battery energy level. More specifically, the network could track how long the UE has operated in the connected mode since a last time that the UE reported its battery energy level or, in the case that the UE is operating in the connected mode for the first time, since the UE transitioned to operating in the connected mode. Additionally and/or alternatively, how long the UE has operated in the connected mode could be tracked over a sliding window of time (e.g. a 24 hour or other duration window).

In accordance with an example embodiment, to track how long the UE has operated in the connected mode, the network could operate a timer that is triggered by an indication that the UE is operating in the connected mode, perhaps by the network receiving signaling (e.g., an RRC Connection Reconfiguration Complete message) that indicates that the UE is transitioning to the connected mode. The timer could be stopped in response to an indication that the UE is no longer operating in the connected mode (e.g., expiration of an inactivity timer). And once the timer is stopped, the network could then store in the UE's context record an amount of time indicated by the timer.

In this arrangement, the network could use the timer to track how long the UE operates in the connected mode continuously or in total over non-continuous periods. For instance, when the UE operates in the connected mode over non-continuous periods of time, the network could store in the UE's context record a length of each non-continuous period of time, and thus could track over multiple instances of the UE operating in the connected mode a total amount of time that the UE operates in the connected mode.

While tracking how long the UE has operated in the connected mode, the network could determine that the amount of time that the UE has operated in the connected mode has exceeded a predetermined threshold, and could responsively cause the UE to report to the network the UE's remaining battery energy level. By way of example, responsive to determining that the amount of time has exceeded the threshold, the network could transmit on the downlink to the UE an RRC Connection Reconfiguration message that requests the UE's remaining battery energy level. And in response, the UE could transmit on the uplink to the network a report of the UE's remaining battery energy level. Other ways of the network transmitting the request and receiving the report are possible as well.

Upon receipt of the report, the network could then determine whether the remaining battery energy level of the UE is below a threshold battery energy level. For instance, the network could compare the UE's remaining battery energy level to the threshold battery energy level. In practice, the UE's remaining battery energy level and the threshold battery energy could be represented in various forms such as a remaining voltage of the battery, a remaining percentage of the battery's energy capacity, and/or a remaining time until the battery is depleted of stored energy, among other forms. By way of example, the network could compare the remaining percentage of the battery's energy capacity to a threshold remaining percentage of a battery's energy capacity.

If the network determines that the remaining battery energy level of the UE is below the predetermined threshold, how the network then proceeds could depend on various conditions, such as a type of communication in which the UE is engaging, a number of times the UE has been handed over, among other conditions. One way the network could proceed is by performing a remedial action that could help conserve the battery energy of the UE, such as releasing the radio-link-connection or increasing the DRX cycle of the UE. In particular, the network could determine based on the various conditions which of the remedial actions to perform. Alternatively, the network could proceed by determining not to perform a remedial action, perhaps so as not to affect the communications in which the UE is engaging. For instance, releasing the radio-link-layer connection transitions the UE to the idle mode where the UE no longer engages in bearer data communications.

In accordance with example embodiments, how the network proceeds could be determined by testing for various conditions that indicate whether the network should perform a particular type of remedial action (e.g., releasing the radio-link-layer connection) or not perform a remedial action. As such, based on the condition that is satisfied, the network could proceed by either performing a particular remedial action or not performing a remedial action. On the other hand, if none of the various conditions are satisfied, the network could proceed by performing a default action.

One condition that the network could test is a type of communication in which the UE is engaging. In particular, a certain type of communication (e.g., video streaming) could be designated in some manner as being of higher importance. These certain types of communication could be those having higher designated priority levels (e.g., higher than a threshold priority level) and/or those designated as latency-sensitive, interruption-sensitive or the like. For a UE that is engaging in these types of high priority communications, the network could proceed by not taking a remedial action so as not to affect the high priority communications. As such, if the network determines that the UE is engaging in a certain type of communication that is designated as high-importance (e.g., video streaming or a similar communication), the network could responsively proceed by determining not to take a remedial action.

In this regard, the network could determine the type of communication in various ways. By way of example, a data packet may have a respective payload segment carrying some or all of the data of the communication and may also have a header. In some cases, the data carried in the payload segment of such packets may be a digitally encoded representation of the particular type of communication to be transmitted. Such communication may itself be media content of some type, such as voice content, web content, gaming content, video content, e-mail content, or the like. Additionally or alternatively, an indicator (e.g., a differentiated services code point (DSCP)) may appear in a data packet's header, and that indicator may be representative of the type of communication carried by that packet. With this arrangement, the network could use various techniques (e.g., deep packet inspection (DPI)) to read the payload and/or header of one or more such packets to programmatically determine one or more types of communication being carried by such packet(s).

Another condition that the network could test is the QCI level of a bearer that is carrying communications between the UE and the network. In particular, the network could determine based on the QCI level whether the QoS level of the communications carried by the bearer is high. For a UE that has a bearer carrying high QoS communications, the network could proceed by not performing a remedial action so as not to affect the communications of the UE. In this regard, to determine whether the UE is engaging in high QoS communications, the network could compare the QoS level of the bearer to a predetermined threshold QoS level. By way of example, the network could determine that the QoS level of the bearer is greater than the threshold QoS level, and could responsively proceed by not performing a remedial action.

Additionally and/or alternatively, the network could determine based on the QCI level whether a user of the UE is a heavy user. For a UE that is associated with heavy usage, the network could proceed by releasing the radio-link-layer connection so as to help minimize battery usage that results from engaging in heavy communications with the network.

In this regard, there are various ways in which the network could determine whether the UE is associated with heavy usage. In some implementations, QCI could be used as an indication of a data-usage class associated with a UE. More specifically, a service provider may have configured the network such that assignment of QCIs for a given UE's communications is further based on the data usage class indicated by the user account or accounts associated with the given UE. In an exemplary embodiment, the network may associate QCI 8 with user accounts that utilize significantly more network resources than average (e.g., more than some threshold amount of data per month), and may select a QCI other than QCI 8 for communications associated a user account that is not designated as a heavy user (e.g., those that use less than some threshold amount of data per month). Accordingly, to determine whether the UE is associated with heavy usage, the network could determine that the QCI level of the bearer is associated with user accounts of heavy users, and could responsively proceed by releasing the radio-link-layer connection between the UE and the base station.

Yet another condition that the network could test is a number of times that the UE has engaged in handover since the last time the UE reported its battery energy level. In particular, if the number of times is greater than a threshold number, the network could responsively proceed by releasing the radio-link-layer connection between the UE and the base station, which could help minimize battery usage that results from repeatedly engaging in handovers.

In this regard, the network could track the number of times that the UE has engaged in handover in various ways. By way of example, the network could operate a counter that is triggered by an indication that the UE has been handed over (e.g., handover signaling), and thus could track the number of times that the UE has engaged in handover. Also, the network could restart the counter each time the UE reports the UE's remaining battery energy level so that that the network could track the number of times that the UE has engaged in handover since the last time the UE reported its battery energy level. In some implementations, tracking the number of times that the UE has engaged in handover could be carried out by an entity (e.g., an MME) other than the base station. To facilitate for the entity to track the number of times that the UE is handed over, a handover message could be sent to the entity each time the UE is handed over.

Conversely, if none of the conditions listed above are met, the network could proceed by performing a default action. By way of example, the default action could be to perform the remedial action of increasing the DRX length of the DRX cycle of the UE. In particular, the network could transmit to the UE an instruction (e.g., an RRC reconfiguration message) to increase the length of the DRX cycle of the DRX mode, and could then update the UE's context record with the increased length of the DRX cycle. Other actions could be designated as the default action as well.

Figure 2:
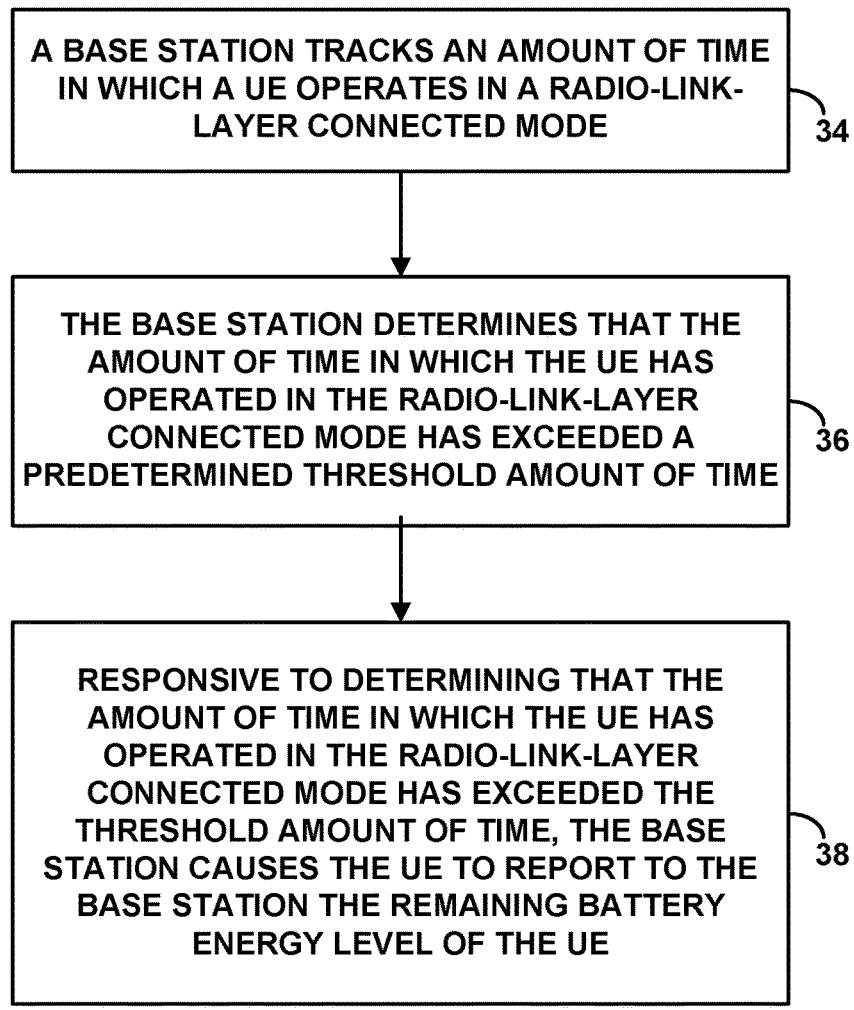
FIG. 2 is a flow chart depicting operations that can be carried out in accordance with the present disclosure.

FIG. 2 is next a flow chart depicting example operations that a base station could carry out in according with this disclosure. The base station in this example is configured to engage in signaling with the UE to establish a radio-link-layer connection with the UE.

As shown in FIG. 2, at block 34, the base station tracks an amount of time in which the UE operates in a radio-link-layer connected mode. (In practice, this operation may involve the base station operating a timer to track the amount of time that the UE operates in the connected mode and may further involve the base station storing the amount of time in the UE's context record). Further, at block 36, the base station determines that the amount of time in which the UE has operated in the radio-link-layer connected mode has exceeded a predetermined threshold amount of time. And at block 38, responsive to determining that the amount of time in which the UE has operated in the radio-link-layer connected mode has exceeded the threshold amount of time, the base station causes the UE to report to the base station the remaining battery energy level of the UE.

Figure 3:
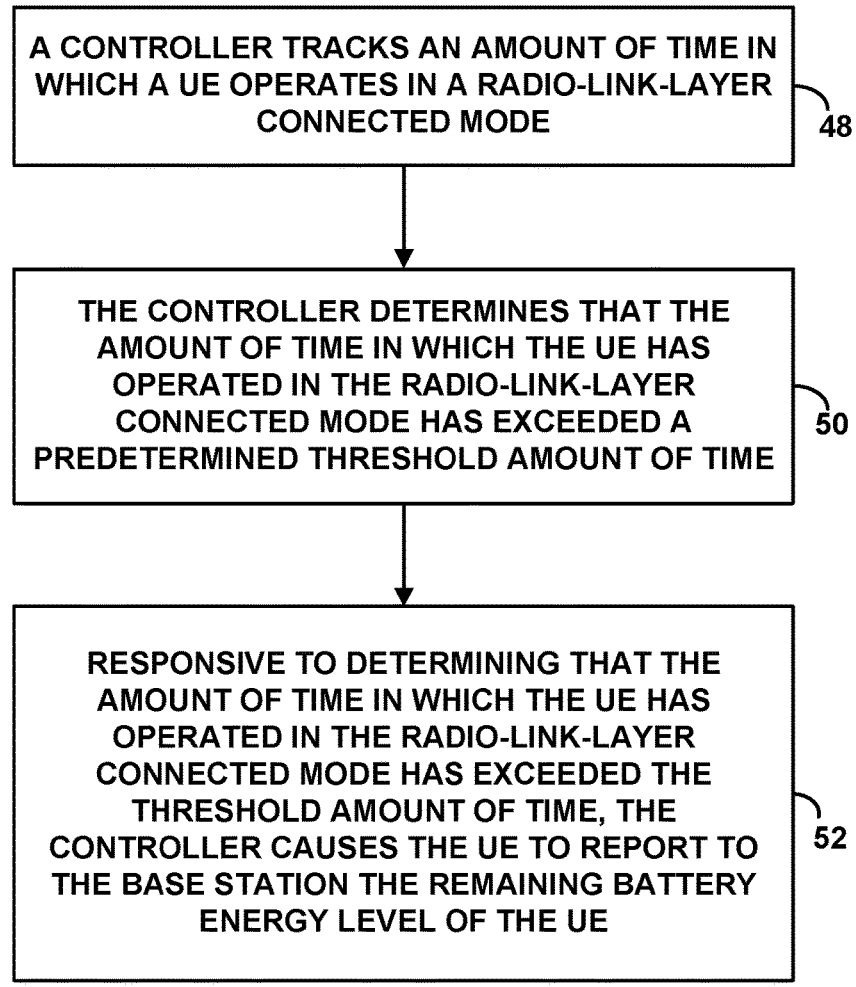
FIG. 3 is another flow chart depicting operations that can be carried out in accordance with the present disclosure.

FIG. 3 is next a flow chart depicting example operations that a controller of a wireless system could carry out in according with this disclosure. The controller of the system may be, for example, the signaling and/or paging controller of the network (e.g., the MME of the network). In another example, the controller could be part of one of the base stations of the network. Further, the system includes a base station that is configured to engage in signaling with a UE to establish a radio-link-layer connection with the UE.

As shown in FIG. 3, at block 48, the controller tracks an amount of time in which the UE operates in a radio-link-layer connected mode. Further, at block 50, the controller determines that the amount of time in which the UE has operated in the radio-link-layer connected mode has exceeded a predetermined threshold amount of time. Yet further, at block 52, responsive to determining that the amount of time in which the UE has operated in the radio-link-layer connected mode has exceeded the threshold amount of time, the controller causes the UE to report to the base station the remaining battery energy level of the UE.

Figure 4:
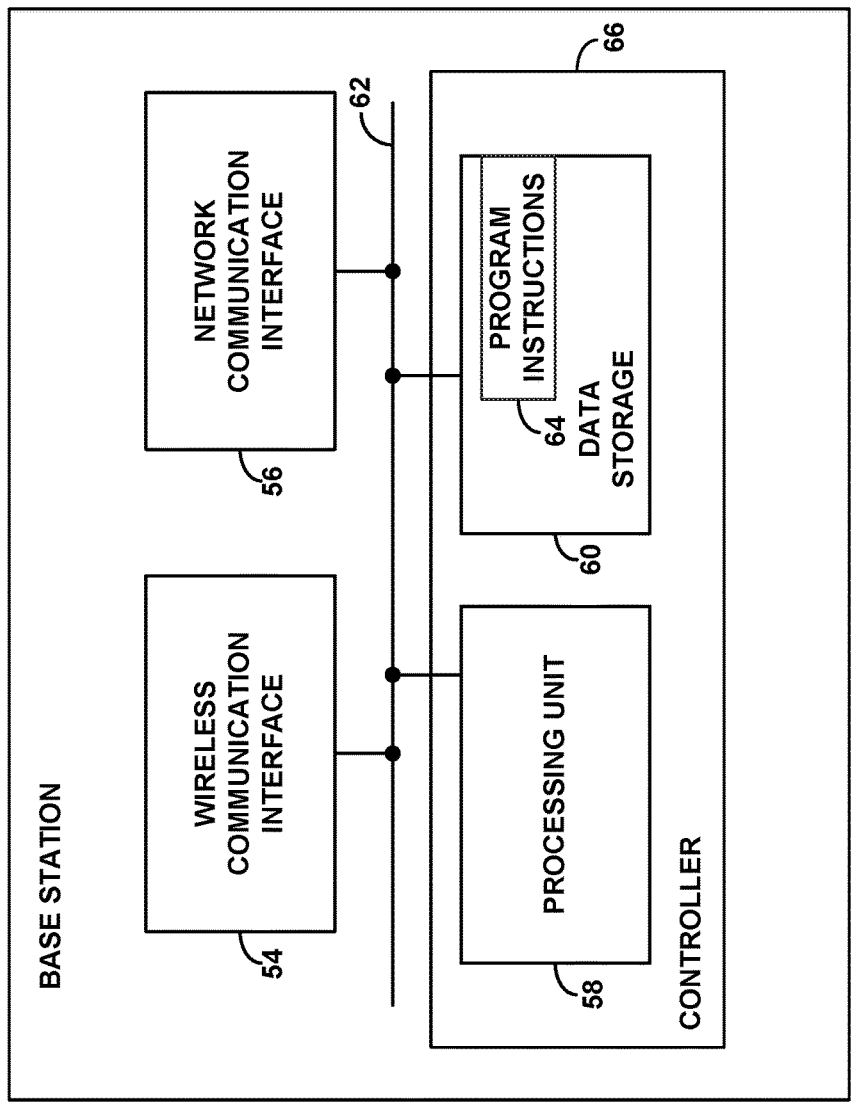
FIG. 4 is a simplified block diagram of a base station operable in accordance with the present disclosure.

Finally, FIG. 4 is a simplified block diagram of an example base station of network 12 (e.g., an eNodeB), showing some of the functional components that may be included in such an entity to facilitate implementation of the disclosed methods. As shown in FIG. 4, the example base station includes a wireless communication interface 54, a network communication interface 56, and a controller 66, all linked together via a system bus, network, or other connection mechanism 62.

In this arrangement, wireless communication interface 54 may be configured to engage in air interface communication with served UEs. As such, wireless communication interface 54 may comprise an antenna structure, which may be tower mounted, and associated components such as a power amplifier and a wireless transceiver, so as to facilitate transmission and reception of bearer and control traffic over the air interface.

Network communication interface 56 may then be configured to provide for communication with various other network elements in a network (e.g., network 12 in FIG. 1), such as a controller (e.g., an MME) or a transport-network gateway (e.g., an SGW). As such, network communication interface 56 may include one or more network interface modules, such as Ethernet network interface modules for instance, or may take any of a variety of other forms that support wireless and/or wired communication with these and other network elements.

And as shown, controller 66 could include a processing unit 58, non-transitory data storage 60, and program instructions 64. Processing unit 58 may comprise one or more general-purpose processors (e.g., microprocessors) and/or one or more special-purpose processors (e.g., application specific integrated circuits), which may be integrated in whole or in part with the communication interfaces. And data storage 60 may comprise one or more volatile and/or non-volatile storage components, such as optical, magnetic, or flash memory, which may be integrated in whole or in part with processing unit 58. Data storage 60 may hold the program instructions 64 that are executable by processing unit 58 to carry out various functions described herein.

Exemplary embodiments have been described above. Those skilled in the art will understand, however, that changes and modifications may be made to these embodiments without departing from the true scope and spirit of the invention.

We claim:

1. In a wireless communication system comprising a base station that has an established radio-link-layer connection with a user equipment (UE) device, a method of controlling reporting a remaining battery energy level of the UE to the base station, the method comprising:
   the base station tracking an amount of time in which the UE operates in a radio-link-layer connected mode;
   the base station determining that the amount of time in which the UE has operated in the radio-link-layer connected mode has exceeded a predetermined threshold amount of time; and
   responsive to determining that the amount of time in which the UE has operated in the radio-link-layer connected mode has exceeded the threshold amount of time, the base station causing the UE to report to the base station the remaining battery energy level of the UE.

2. The method of claim 1, wherein the base station tracking the amount of time in which the UE operates in the radio-link-layer connected mode is triggered by the UE starting to operate in the radio-link-layer connected mode.

3. The method of claim 1, wherein the amount of time in which the UE has operated in the radio-link-layer connected mode is a continuous amount of time.

4. The method of claim 1, wherein the amount of time in which the UE has operated in the radio-link-layer connected mode is a non-continuous amount of time.

5. The method of claim 4, wherein there are multiple instances of the UE operating in the radio-link-layer connected mode during a period of time, and wherein tracking an amount of time in which the UE operates in a radio-link-layer connected mode comprises tracking a total amount of time that the UE operates in the radio-link-layer connected mode during the period of time.

6. The method of claim 1, wherein the base station causing the UE to report to the base station the remaining battery energy level comprises:
   the base station transmitting to the UE a radio-resource-control (RRC) connection reconfiguration message that instructs the UE to report to the base station the remaining battery energy level.

7. The method of claim 1, further comprising:
   the base station controlling service to the UE in response to determining that the remaining battery energy level of the UE is below a threshold battery energy level.

8. The method of claim 7, wherein the base station controlling service to the UE comprises the base station performing one of: (i) releasing the radio-link-layer connection, or (ii) increasing a discontinuous reception (DRX) cycle of a DRX mode for the UE.

9. The method of claim 8, wherein increasing the DRX cycle of the DRX mode for the UE comprises:
   transmitting an instruction to the UE to increase the DRX cycle of the DRX mode of the UE; and
   updating a UE context record to indicate a length of the increased DRX cycle.

10. The method of claim 9, wherein the instruction comprises a radio-resource-control (RRC) connection reconfiguration message that instructs the UE to increase the DRX cycle of the DRX mode of the UE.

11. The method of claim 8, wherein the UE has a bearer connection extending, via the base station, between the UE and a packet data network gateway (PGW), wherein the bearer connection has a quality of service (QoS) level, and wherein the base station controlling service to the UE is based at least in part on determining that the QoS level is less than a predetermined threshold.

12. The method of claim 7, further comprising:
   wherein the base station controlling service to the UE is based at least in part on determining that the UE has been handed over a threshold number of times, and wherein the base station controlling service to the UE comprises the base station releasing the radio-link-layer connection.

13. In a wireless communication system comprising a base station that has an established radio-link-layer connection with a user equipment (UE) device, a method of controlling reporting a remaining battery energy level of the UE to the base station, the method comprising:
   a controller tracking an amount of time in which the UE operates in a radio-link-layer connected mode;
   the controller determining that the amount of time in which the UE has operated in the radio-link-layer connected mode has exceeded a predetermined threshold amount of time; and
   responsive to determining that the amount of time in which the UE has operated in the radio-link-layer connected mode has exceeded the threshold amount of time, the controller causing the UE to report to the base station the remaining battery energy level of the UE.

14. The method of claim 13, wherein the controller is a mobility management entity (MME).

15. A wireless communication system comprising:
   a base station that serves a user equipment device (UE) over an air interface connection between the UE and the base station, wherein when the base station serves the UE, the UE has two mutually exclusive modes of operation: (a) a connected mode in which there the UE has an established radio-link-layer connection with the base station, and (b) an idle mode in which the UE lacks the established radio-link-layer connection with the base station; and
   a controller comprising at least one processing unit, data storage, and program instructions stored in the data storage and executable by the at least one processing unit to carry out operations, the operations comprising:
      (i) operating a timer for tracking an amount of time that the UE operates in the connected mode,
      (ii) based on the timer, determining that the amount of time that the UE has operated in the connected mode is greater than a threshold amount of time, and
      (iii) responsive to the determination and based at least in part on that the UE is operating in the connected mode, causing the UE to report to the base station a remaining battery energy level of the UE.

16. The wireless communication system of claim 15, wherein the controller is a mobility management entity (MME).

17. The wireless communication system of claim 15, wherein operating a timer for tracking an amount of time that the UE operates in a connected mode comprises:
   starting the timer in response to the UE operating in the connected mode.

18. The wireless communication system of claim 15, wherein the amount of time that the UE has operated in the connected mode comprises a total amount of time that the UE has operated in the connected mode over a window of time.

19. The wireless communication system of claim 15, wherein causing the UE to report to the base station a remaining battery energy level comprises:
   transmitting to the UE a radio-resource-control (RRC) connection reconfiguration message that instructs the UE to report to the base station the remaining battery energy level.

20. The wireless communication system of claim 15, wherein the controller is part of the base station.

* * * * *